G. F. DICKSON.
FREEZER.
APPLICATION FILED FEB. 7, 1912.

1,039,654.

Patented Sept. 24, 1912.

3 SHEETS—SHEET 2.

Attest:
Chas. H. Bull
Henry Mos.

Inventor:
George F. Dickson,
By Robert Burns
Atty.

G. F. DICKSON.
FREEZER.
APPLICATION FILED FEB. 7, 1912.
1,039,654.
Patented Sept. 24, 1912.
3 SHEETS—SHEET 3.
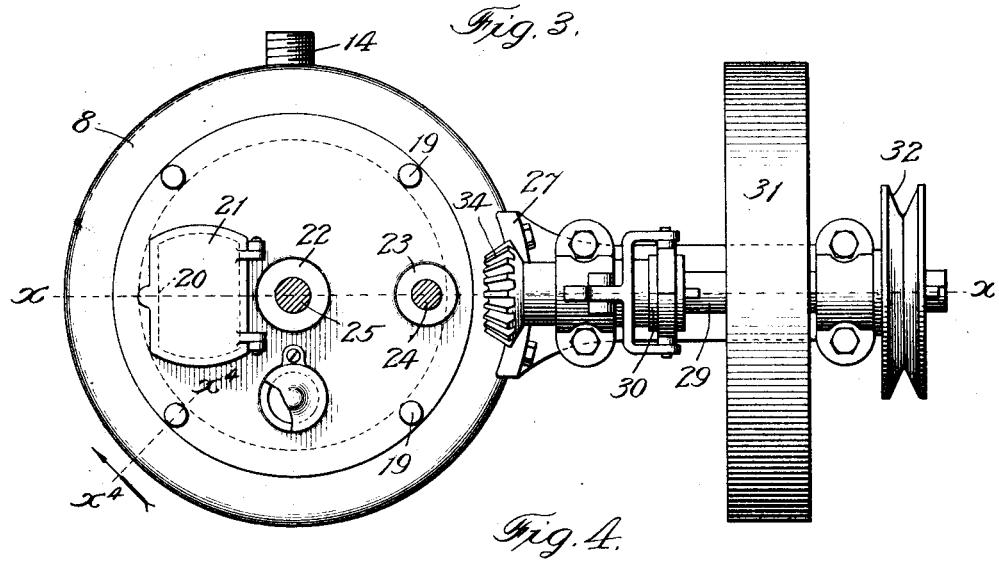
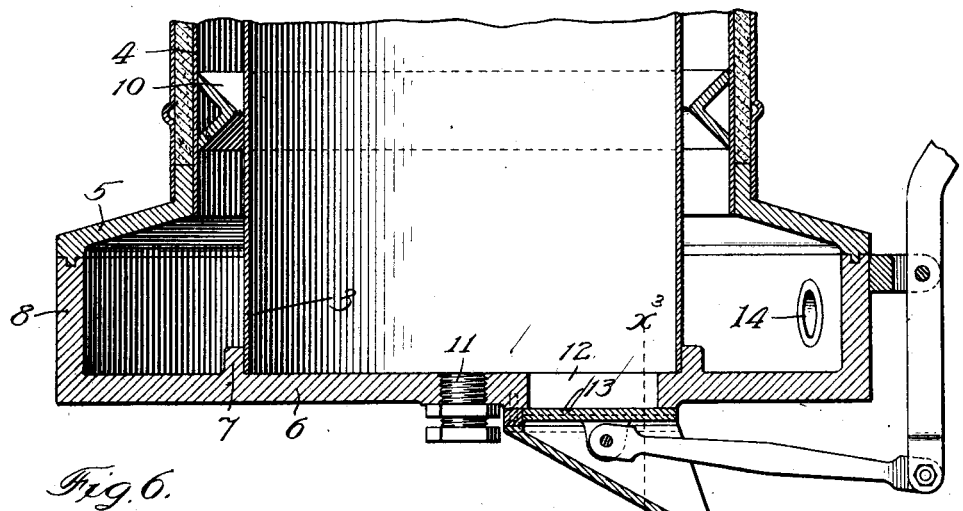
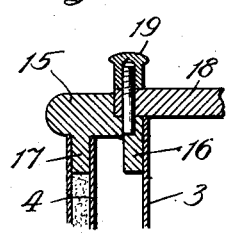
Attest.
Chas. H. Buell.
Henry Mos.
Inventor:
George F. Dickson
By Robert Burns Atty

UNITED STATES PATENT OFFICE.

GEORGE F. DICKSON, OF CHICAGO, ILLINOIS, ASSIGNOR TO CONFECTIONERS AND BAKERS SUPPLY CO., OF CHICAGO, ILLINOIS, A CORPORATION OF ILLINOIS.

FREEZER.

1,039,654.     Specification of Letters Patent.     Patented Sept. 24, 1912.

Application filed February 7, 1912. Serial No. 676,141.

*To all whom it may concern:*

Be it known that I, GEORGE F. DICKSON, a citizen of the United States of America, and a resident of Chicago, in the county of Cook, State of Illinois, have invented certain new and useful Improvements in Freezers, of which the following is a specification.

This invention relates to that type of freezers in which a vertically arranged freezing chamber is surrounded by an annular refrigerating chamber and provided with revolving scrapers and agitators for their usual action on the material during the progress of the freezing operation. And the present invention has for its object to provide a simple and efficient structural formation and combination of parts whereby increased cooling capacity is provided at the portion of the freezing chamber where the material is mainly converted from an initial liquid form to a solid condition and with which the flow of the brine or like refrigerating liquid through the annular refrigerating chamber is repeatedly directed against the wall of the freezing chamber to attain a very effective heat transference from the material undergoing treatment to the brine or like cooling fluid, all as will hereinafter more fully appear.

Figure 1:
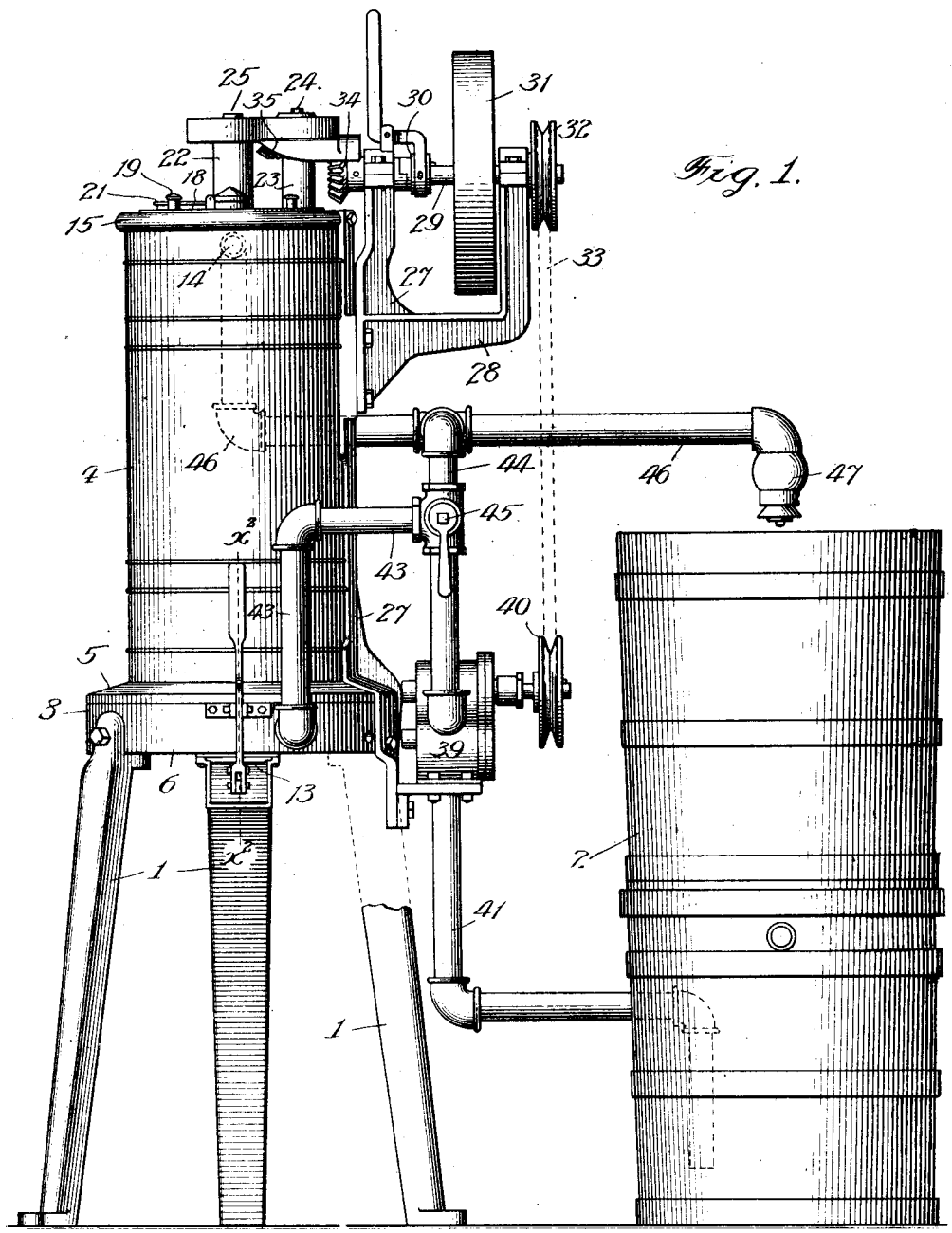
Figure 2:
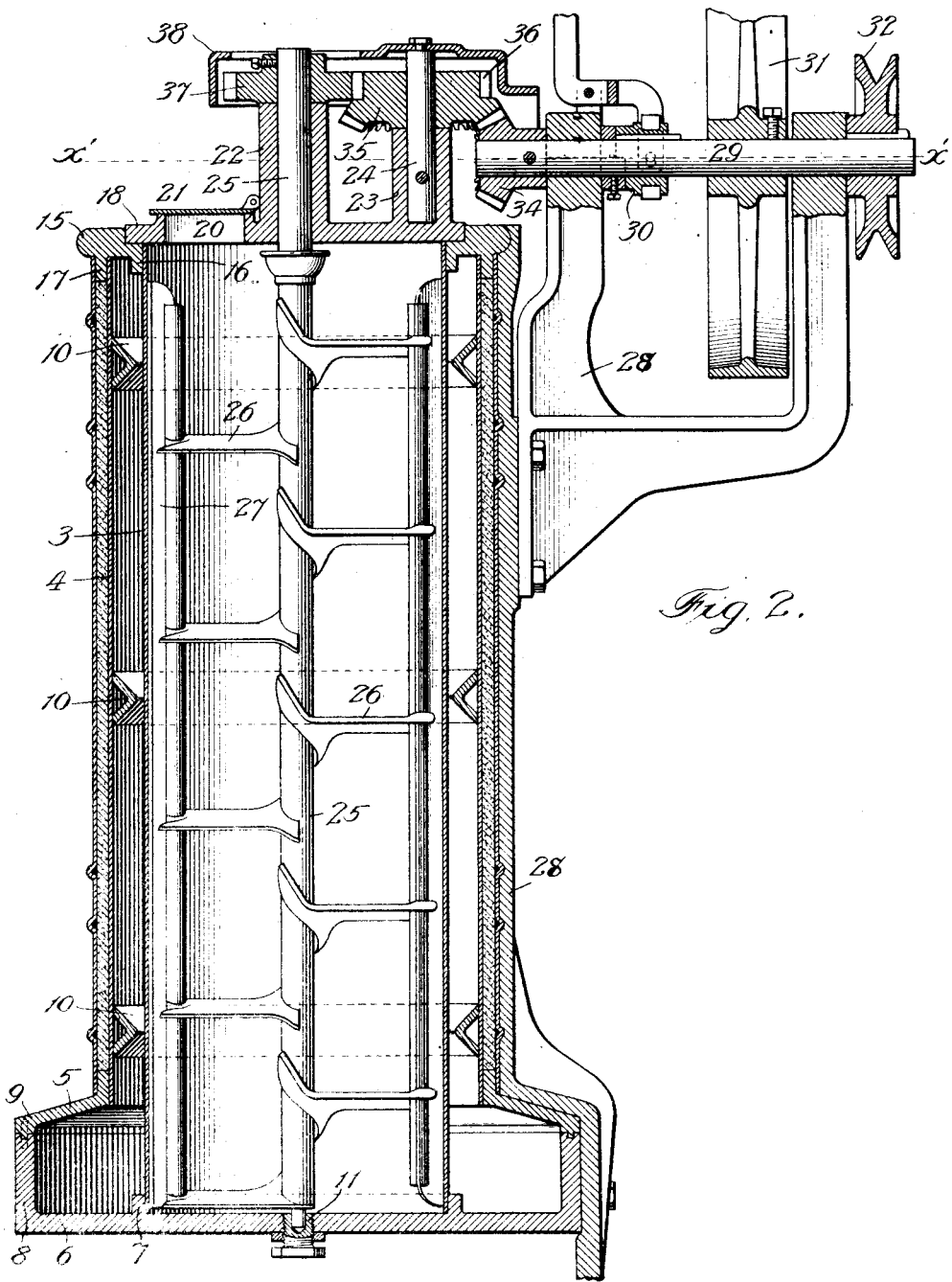

In the accompanying drawings:—Figure 1, is a side elevation illustrating the general arrangement of an ice-cream freezing apparatus to which the present invention is applied. Fig. 2, is a vertical section of the freezer on line $x$—$x$, Fig. 3. Fig. 3, is a horizontal section on line $x'$—$x'$, Fig. 2. Fig. 4, is an enlarged detail section on line $x^2$—$x^2$, Fig. 1. Fig. 5, is a similar view on line $x^6$—$x^3$, Fig. 4. Fig. 6, is a similar view on line $x^4$—$x^4$, Fig. 3.

Similar reference numerals indicate like parts in the several views.

Referring to the drawings, 1 represents the supporting stand upon which the freezing apparatus is supported in a proper elevated position with relation to the brine cooling tub or appliance 2, arranged in adjacent relation to the freezing apparatus, and so that the circulation of the brine during the process will be aided by gravity and the work imposed upon the circulating pump materially reduced.

3 is a vertically arranged annular shell constituting the vertical inclosing wall of the freezing chamber, and the inner wall of the annular brine chamber of the freezing apparatus.

4 is a jacketed annular shell constituting the outer inclosing wall of the brine chamber aforesaid. The shell 4 in the present improvement is formed with an outwardly flared rim 5 for the purpose hereinafter stated.

6 is a lower head forming the closed bottom for the respective freezing and refrigerating chambers above described, and said closure head 6 is formed with an upwardly projecting annular flange 7 to which the lower end of the aforesaid shell 3 is secured by brazing or other usual means. At its periphery said closure head is provided with an upwardly projecting rim 8 corresponding with the lower rim 5, of the shell 4, and secured thereto by screws 9 or other usual fastening means.

With the described construction an enlarged brine capacity is provided at the lower end of the aforesaid refrigerating chamber, in adjacent relation to the lower portion of the freezing chamber, at which point the congealation of the chamber acted upon is mainly effected, and in consequence a ready and rapid congealation is attained by the increased volume of brine at such point in the heat transference operation during the progress of the process.

10 are horizontally arranged annular dams or projections, preferably of a V shape in cross section, and arranged on the inner surface of the outer shell 4, with their apexes projecting into adjacent relation to the inner shell 3, to form restricted passages at such points and cause the upwardly flowing brine to be repeatedly directed against the shell 3, so that a more effective heat transference will be attained in the freezing operation of the apparatus.

11 is a step bearing arranged centrally in the head 6 for the lower end of the carrying shaft of the agitating and scraping blades, hereinafter described.

12 is a discharge opening in the head 6 and communicating with the interior of the freezing chamber above described.

13 is a manually actuated slide controling the discharge opening 12 aforesaid.

14 is a brine inlet or neck in the outer rim 8 of the lower closure head 6, for the introduction of the cooled brine into the lower and expanded end of the refrigerating chamber aforesaid.

15 is an upper annular closure rim secured to the top of the shells 3 and 4, by means of downwardly projecting annular flanges 16 and 17, arranged in concentric and separated relation, and to which the upper ends of the shells 3 and 4 are secured by brazing or other usual means.

18 is a removable closure head fitting an annular offset in the margin of the central opening of the aforesaid annular rim 15, and providing access to the top of the freezing chamber. The closure head 18 is secured in place by attaching screws and nuts 19 as shown in Fig. 6, and is only intended to be removed when it is desired to take out the agitating and scraping means hereinafter described in a cleaning or like operation of the apparatus.

20 is a filling orifice in the closure head 18 for the introduction of the material to be treated into the freezing chamber aforesaid, and 21 is a hinged cover for closing said orifice after the filling operation aforesaid.

22 is a central bearing neck on the closure head 18 for the shaft of the hereinafter described scraping and agitating blades, and 23 is a secondary bearing neck arranged on said closure head 18 in separated lateral relation to the central bearing neck 22 and adapted to support a countershaft 24, which in turn carries a pair of gear wheels of the hereinafter described driving mechanism of the apparatus.

25 is the carrying shaft of the agitating and scraping blades before referred to, and said shaft is journaled at its upper end in the central bearing neck 22 aforesaid, and at its lower end in the step bearing 11 aforesaid. The described arrangement permits of the removal of the shaft along with the removable closure head 18 above described.

26 are radial agitating blades secured in spaced relation on the shaft 25 from one end to the other of the freezing chamber, aforesaid.

27 are vertical scraper blades carried on the outer end of the radial blades 26 aforesaid, and adapted to have scraping engagement with the inner vertical face of the shell 3, forming the vertical enclosure of the freezing chamber.

28 is a journal bracket secured to the side of the apparatus and provided with horizontal bearings for the driving shaft 29 of the mechanism. Said shaft 29 is preferably formed in two sections connected together by a manually actuated clutch 30 of any usual form, and by which the shaft sections can be coupled and uncoupled as required in the various operations of the apparatus.

31 is a belt pulley arranged centrally on the shaft 29 and adapted to receive motion from a suitable power source.

32 is a pulley mounted on the outer end of the shaft 29 and connected by a belt 33 with the driving pulley of the brine circulating pump hereinafter described.

34 is a bevel gear wheel secured to the inner end of the shaft 29 and having driving engagement with a companion bevel gear wheel 35, mounted on the before described countershaft 24. And said bevel gear wheel 35 in turn carries a gear wheel 36, that meshes with and drives a gear wheel 37 on the carrying shaft 25 of the agitating and scraping blades above described.

38 is a gear casing inclosing the gear wheels 34, 35, 36 and 37, to protect the operator from injury while manipulating the apparatus.

39 is a brine circulating pump carried by the bracket 28 aforesaid. Said pump is preferably of the rotary type shown, and is provided with a driving shaft and pulley 40 operatively engaged by the belt 33 above described.

41 is the supply pipe of the pump 39, aforesaid, and extends from the inlet end of said pump to the lower part of the brine cooling tub 2. The said tub is preferably of the construction described in detail in a companion application for letters patent, Serial Number 676,142, filed Feby. 7, 1912.

43 is the outlet or discharge pipe of the pump 39, extending to the lower portion of the refrigerating chamber heretofore described and connecting with the inlet neck 14 thereof. The discharge pipe 43 is provided with a branch pipe 44, which connects the pipe 43 with the brine return pipe hereinafter described, and the connection of said branch pipe 44 to the pipe 43 is controlled by a three-way cock 45, by which the flow of the brine from the pump 39 can be directed to the refrigerating chamber of the apparatus, or to the brine return pipe above referred to, and as fully described in the companion application Serial No. 676,142 above referred to.

46 is the brine return pipe extending from the upper end of the aforesaid refrigerating chamber to a point above the brine tub 2 aforesaid, and ending in a spray or jet head 47 of any usual construction adapted to spray the returning brine down upon the mass of broken ice contained in the upper portion of the tub 2.

Having thus fully described my said invention what I claim as new and desire to secure by Letters Patent, is:—

1. The combination in a freezer, of a vertically arranged inner shell constituting a freezing chamber and an outer shell inclosing the inner shell to form an annular refrigerant chamber, the lower end of said refrigerant chamber having an expanded form, substantially as set forth.

2. The combination in a freezer, of a vertically arranged inner shell constituting a freezing chamber, an outer shell inclosing the inner shell to form an annular refrigerant chamber, and a series of annular dams secured to the inner face of said outer shell, and having a width less than the width of the annular chamber, substantially as set forth.

3. The combination in a freezer, of a vertically arranged inner shell constituting a freezing chamber, an outer shell inclosing the inner shell to form an annular refrigerant chamber, and a series of annular dams secured to the inner face of said outer shell and having a triangular form in cross section, substantially as set forth.

4. The combination in a freezer, of a vertically arranged inner shell constituting a freezing chamber, an outer shell inclosing the inner shell to form an annular refrigerant chamber, and a series of annular dams secured to the inner face of said outer shell, the lower end of said refrigerating chamber having an expanded form, substantially as set forth.

Signed at Chicago, Illinois, this 1st day of February, 1912.

GEORGE F. DICKSON.

Witnesses:
ROBERT BURNS,
HENRY MOE.